(12) United States Patent
Kim et al.

(10) Patent No.: US 9,323,986 B2
(45) Date of Patent: Apr. 26, 2016

(54) METHOD AND DEVICE FOR RECOGNIZING SITUATION BASED ON IMAGE USING TEMPLATE

(71) Applicant: KOREA ELECTRONICS TECHNOLOGY INSTITUTE, Seongnam-si, Gyeonggi-do (KR)

(72) Inventors: Seunghun Kim, Seoul (KR); Ilkyun Jung, Hwaseong-si (KR)

(73) Assignee: KOREA ELECTRONICS TECHNOLOGY INSTITUTE, Seongnam-Si, Gyeonggi-Do (KR)

( * ) Notice: Subject to any disclaimer, the term of this patent is extended or adjusted under 35 U.S.C. 154(b) by 0 days.

(21) Appl. No.: 14/313,662

(22) Filed: Jun. 24, 2014

(65) Prior Publication Data

US 2014/0307922 A1    Oct. 16, 2014

Related U.S. Application Data

(63) Continuation of application No. PCT/KR2012/011558, filed on Dec. 27, 2012.

(30) Foreign Application Priority Data

Dec. 27, 2011 (KR) .......................... 10-2011-0143359

(51) Int. Cl.
*G06K 9/00* (2006.01)
*G06K 9/62* (2006.01)

(52) U.S. Cl.
CPC ........ *G06K 9/00335* (2013.01); *G06K 9/00664* (2013.01); *G06K 9/00791* (2013.01); *G06K 9/6201* (2013.01)

(58) Field of Classification Search
CPC .......... G06K 9/00335; G06K 9/00664; G06K 9/00791; G06K 9/6201
See application file for complete search history.

(56) References Cited

U.S. PATENT DOCUMENTS 5,271,068 A * 12/1993 Ueda .................... G06K 9/4609
382/156
5,946,220 A * 8/1999 Lemelson .............. B01D 17/00
210/745

(Continued)

FOREIGN PATENT DOCUMENTS

| JP | 09282455 A | 10/1997 |
| JP | 2002367077 A | 12/2002 |
| JP | 2005326966 A | 11/2005 |

OTHER PUBLICATIONS

International Search Report for application No. PCT/KR2012/011558 dated Feb. 21, 2013, citing the above reference(s).

(Continued)

*Primary Examiner* — Shefali Goradia
(74) *Attorney, Agent, or Firm* — Hauptman Ham, LLP

(57) ABSTRACT

The present invention relates to a method and device for recognizing a situation based on an image using a template. The present invention provides the device for recognizing a situation based on an image. The device includes a camera unit capturing an image which is divided into a plurality of regions and having a template for each of the regions, the template defining characteristics of each of the regions, and a control unit detecting an object in the image and determining the situation surrounding the object according to the template mapped to the region to which the detected object belongs. In addition, the present invention provides the method of operating the device for recognizing a situation.

5 Claims, 5 Drawing Sheets

(56) References Cited

U.S. PATENT DOCUMENTS

| | | | | |
|---|---|---|---|---|
| 5,999,877 | A * | 12/1999 | Takahashi et al. | 701/117 |
| 6,351,573 | B1 * | 2/2002 | Schneider | G06F 19/321 382/128 |
| 6,760,061 | B1 * | 7/2004 | Glier et al. | 348/149 |
| 7,308,139 | B2 * | 12/2007 | Wentland et al. | 382/181 |
| 9,058,744 | B2 * | 6/2015 | Huang et al. | |
| 2003/0058341 | A1 * | 3/2003 | Brodsky et al. | 348/169 |
| 2010/0287500 | A1 * | 11/2010 | Whitlow et al. | 715/810 |

OTHER PUBLICATIONS

Zhe Lin et al. "Shape-Based Human Detection and Segmentation via Hierarchical Part-Template Matching", IEEE Transactions on pattern analysis and machine intelligence, Apr. 2010, p. 604-608, vol. 32, No. 4.

* cited by examiner

METHOD AND DEVICE FOR RECOGNIZING SITUATION BASED ON IMAGE USING TEMPLATE

CROSS-REFERENCE TO RELATED APPLICATION

The instant application is a continuation of PCT/KR2012/011558, filed Dec. 27, 2012, which is based on and claims priority of Korean Patent Application No. 10-2011-0143359, filed on Dec. 27, 2011, in the KIPO (Korean Intellectual Property Office). The disclosures of above-listed applications are hereby incorporated by reference herein in their entirety.

TECHNICAL FIELD

The present invention relates to context-awareness technology, and more particularly, to a method and device for detecting an object based on an image and recognizing a situation based on the detected object and a previously determined and stored template.

BACKGROUND

Recently, with an increase in the number of vehicle owners, there has been an increased interest in developing comfortable and safe vehicles. In particular, a continuous increase in the number of vehicles, a limitation in construction of roads, and an inefficiency of management cause enormous human and material losses every year. That is, such losses are caused by the limitation in constructing new roads or widening existing roads to accommodate the increased number of vehicles. In order to minimize negative influences on traffic and environmental conditions, various research is being conducted to provide high-tech information communication devices and control units in order to increase the safety of vehicle operations. As a solution to the limitations, an intelligent traffic system which integrates persons, roads, and vehicles using highly-advanced data communication technology provides an efficient increase in the road management, optimization of traffic management, safety of driving, and so on. Research on the intelligent traffic system is being conducted by several countries to solve problems caused by current traffic systems, and also to reduce traffic congestion, facilitate traffic flow, save energy, and increase of safety of drivers and vehicles. In addition, there is a field of computer vision, which processes image information using a charge coupled device (CCD) camera to recognize a road, a boundary between roads, a lane, and so on. Such conventional technology only detects an object, and thus intelligent information is required to be used, for example, to recognize a situation associated with the detected object.

SUMMARY

The present invention is directed to providing a method and device for detecting an object based on an image and recognizing a situation based on the detected object and a previously determined and stored template.

One aspect of the present invention provides an image-based situation recognition device including: a camera unit configured to capture an image, in which the image is divided into a plurality of regions and each region has a template defining a characteristic of the region; and a control unit configured to detect an object in the image and determine a situation of the object according to the template mapped to the region including the detected object.

The template may define a type of the object detected in the region.

The control unit may detect the object in the region with reference to the type of the object defined in the template.

The template may define a behavioral characteristic of the object detected in the region.

The control unit may compare a behavior of the object detected in the region with the behavioral characteristic of the object defined in the template to determine the situation of the object.

Another aspect of the present invention provides an image-based situation recognition method including: capturing an image, in which the image is divided into a plurality of regions and each region has a template defining a characteristic of the region; detecting an object in the image; and determining a situation of the object according to the template mapped to the region including the detected object.

The template may define a type of the object detected in the region, and the detecting may include detecting the object in the region with reference to the type of the object defined in the template.

The template may define a behavioral characteristic of the object detected in the region, and the determining may comprise comparing a behavior of the object detected in the region with the behavioral characteristic of the object defined in the template to determine the situation of the object.

As described above, the present invention can detect an object based on an image and recognize a situation based on the detected object and a previously determined and stored template, thus providing a variety of accurate information. Furthermore, the present invention may make various determinations with no control by a user, thus being efficient in a related industrial field and reducing costs.

DETAILED DESCRIPTION

In the following description, detailed descriptions of well-known functions or constructions will be omitted since they would obscure the invention in unnecessary detail.

It should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Hereinafter, exemplary embodiments of the present invention will be described in detail.

Figure 1:
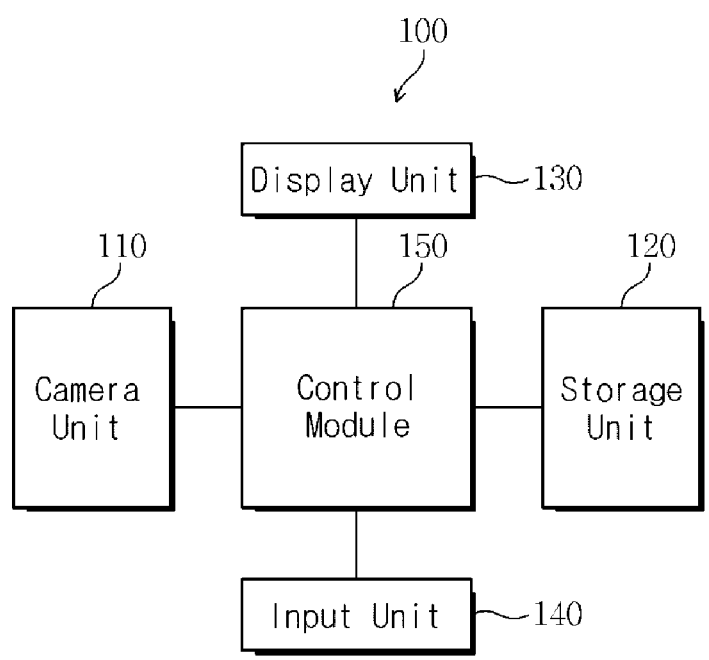
FIG. 1 is a block diagram illustrating an image-based situation recognition device according to an embodiment of the present invention.

FIG. 1 is a block diagram illustrating an image-based situation recognition device according to an embodiment of the present invention.

Referring to FIG. 1, a situation recognition device 100 according to an embodiment of the present invention captures an image, recognizes an object in the captured image, determines a situation of the recognized object, and outputs a determination result. The situation recognition device 100 includes a camera unit 110, a storage unit 120, a display unit 130, an input unit 140, and a control unit 150.

The camera unit 110, which is provided to capture an image, may include a lens, an optical sensor, a signal processing module, and an image processing module. The optical sensor captures an image through the lens and converts an optical image, which is the captured image, into an analog electronic image. The optical sensor preferably includes a charge coupled device (CCD) sensor. The signal processing module converts the analog image output from the optical sensor into a digital image. Here the signal processing module preferably includes a digital signal processor (DSP). The image processing module processes the digital image output from the signal processing module such that the process image may be displayed on the display unit (or other display device), and outputs the processed image.

The storage unit 120 includes a storage device such as a hard disk and a memory such as a DRAM. The storage device and the memory may be detachable. The storage unit 120 may include a device for performing attachment and detachment. The storage unit 120 may store required data according to an embodiment of the present invention. For example, the storage unit 120 may store the above-described template, which is mapped to each region. The storage unit 120 includes a main memory and an auxiliary memory. The storage unit 120 may store an operating system, an application for performing a situation recognition method according to an embodiment of the present invention, and so on. The data stored in the storage unit 120 may be deleted, changed, and added according to a manipulation of a user.

The display unit 130 displays an image that is output from the camera unit 110 or an image that is obtained and then output through the control unit 150 by processing the image output from the camera unit 110. The display unit 130 may be formed as a touch screen. If the display unit 130 is formed as a touch screen, the display unit 130 may perform some or all of functions of the input unit 140.

The input unit 140 is a means for inputting any one of a user's command, selection, data, and information, which may include a plurality of input keys and function keys for receiving number or character information and setting various functions. In addition, the input unit 140 senses a key input from a user and delivers an input signal to the control unit 150 according to the sensed key input. For example, the input unit 140 may include all types of input units to be developed in the future, in addition to a typical input device such as a keyboard, a keypad, a mouse, and a joystick. When the display unit 130 is formed as a touch screen, the touch screen may include a function of the input unit 140.

The control unit 150 may be a processing device for driving an operating system, an application, and so on. For example, the control unit 150 may be a central processing unit (CPU). When the situation recognition device is powered on, the control unit 150 moves an operating system (OS) from an auxiliary memory of the storage unit 120 to a main memory of the storage unit 120 and then performs a boot operation to drive the operating system. In addition, the control unit 150 may load and execute an application that is stored in the storage unit 120 when a request to execute an application according to a manipulation of a user is received.

In particular, the control unit 150 may recognize an object in an image that is received from the camera unit 110. For example, when the image is received from the camera unit 110, the control unit 150 may divide the image into a plurality of regions each having a pre-stored template and detect an object in any one of the plurality of regions.

The template describes a type and a characteristic of an object that is detected in a specific region. For example, a template that is mapped to a lane may describe a shape, color, or the like of a vehicle that is detected in the lane. Accordingly, the control unit 150 may detect an object in a specific region with reference to the type and characteristic of the object, which are described in the template mapped to the specific region. For example, the control unit 150 may detect a vehicle, which is an object, in a lane with reference to a template mapped to the lane when a divided region is the lane. The image-based object recognition method includes various methods. However, it is assumed in the present invention that a color-based object recognition method is used. The object recognition method according to the present invention is not limited thereto. When the color-based object recognition is used, the control unit 150 may detect a vehicle, which is an object, by distinguishing a color of the vehicle from a color (for example, gray) of the lane with reference to a color and an appearance of a vehicle described in the template.

Also, the template defines a characteristic of a behavior (operation) of an object that is detected in a specific region. The template may define a characteristic of a behavior (operation) of a vehicle in a lane. For example, when a driver should drive on the right side of the road, such as in South Korea, a traffic direction of the vehicle is defined as left to right. Accordingly, the control unit 150 may compare a behavior of an object that is detected in a specific region with a behavior of the object that is described in a template to determine a situation of the object. For example, the control unit 150 may determine a vehicle having a traveling direction opposite to the traffic direction defined in the template as driving in the wrong lane. Then, the control unit 150 may output a result of the determination of the situation of the object.

Figure 2:
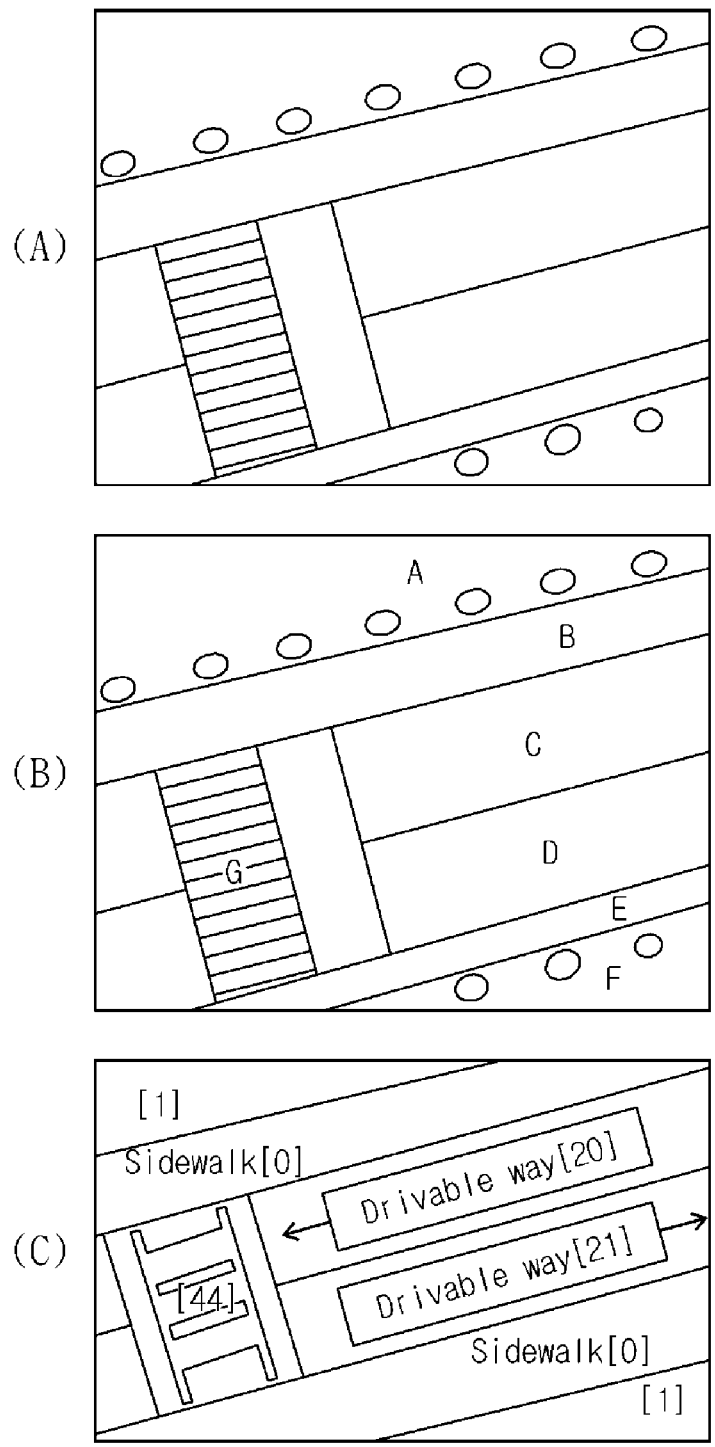
FIG. 2 is a view illustrating an example of a screen image for illustrating an image-based situation recognition method using a template according to an embodiment of the present invention.

FIG. 2 is a view illustrating an example of a screen for illustrating an image-based situation recognition method using a template according to an embodiment of the present invention.

In FIG. 2, (A) of FIG. 2 shows an image that is captured through the camera unit 110. According to an embodiment of the present invention, the image shown in (A) of FIG. 2 may be divided into a plurality of regions. An example of such a screen image is as shown in (B) of FIG. 2. As shown in (B) of FIG. 2, the plurality of regions are denoted as A, B, C, D, E, F, and G. Regions B and E are sidewalks, and a region G is a crosswalk. In addition, it can be seen that regions C and D are drivable ways. It can be also seen that regions A and F are vacant lots, neither sidewalks nor drivable ways. According to an embodiment of the present invention, respective regions are identified, regions having the same characteristic are grouped, and then a template is set for each region. An example of such a screen image is as shown in (C) of FIG. 2.

Respective templates have meanings as provided in Table 1 below.

TABLE 1

| TEMPLATE | MEANING |
|---|---|
| [0] | SIDEWALK |
| [1] | BACKGROUND (VACANT LOT) |
| [2X] | DRIVABLE WAY |
| [X0] | DIRECTION OF "←" |
| [X1] | DIRECTION OF "→" |
| ... | ... |

Referring to Table 1, as shown in (C) of FIG. 2, the regions B and E are grouped as a sidewalk and are set as a template [0]. In addition, the region G is a crosswalk and is set as a template [44]. Each of the regions A and F is a vacant lot and is set as a template [1]. The regions C and D are grouped as a drivable way, but are set as templates [20] and [21], respectively. In other words, the template [20] denotes a drivable way (as indicated by [2X]) having a vehicle traveling direction of "←" (as indicated by [X0]). Similarly, the template [21] denotes a drivable way having a vehicle traveling direction of "→." That is, the drivable ways are separated according to the vehicle traveling direction. It is possible to increase an object detection accuracy in a corresponding region and to recognize a situation of an object that is detected in the corresponding region according to the characteristics defined by the templates.

In an embodiment of the present invention, the template defines a type of the object that is detected in the corresponding region, in order to increase the object detection accuracy. For example, since the template [0] denotes a sidewalk, there is a high probability that the detected object will be a person. Furthermore, since the template [21] denotes a drivable way having the direction of "→," there is a high probability that the detected object will be a vehicle. Accordingly, when detecting an object in each region, it is possible to increase the object detection accuracy by referring to the templates. For example, since the template [21] denotes a drivable way having the direction of "→," and thus there is a high probability that the detected object will be a vehicle, it is possible to increase detection efficiency and accuracy when detecting an outline of the object in consideration of a shape of the vehicle.

In addition, in an embodiment of the present invention, the template defines a behavioral characteristic of the object that is detected in the corresponding region, in order to increase the object detection accuracy. For example, the template [2X] denotes a drivable way, and the template [X0] denotes the direction of "←." Accordingly, it is a high probability that an object detected in a region corresponding to the template [20] will be a vehicle. If the detected object is a vehicle, the vehicle must move in the direction of "←." If in the template [20], the object (vehicle) moves in the direction of "→," the vehicle may be determined to be driving in the wrong lane. In addition, the template [0] denotes a sidewalk. If a vehicle is detected, as the object, in a region that is mapped to the template [0], the vehicle may be determined as trespassing on the sidewalk.

According to an embodiment of the present invention, as described above, a situation recognition device 100 determines a situation of an object and performs processing according to the determined situation. For example, when the vehicle is determined as driving in the wrong lane or as trespassing on a sidewalk, the situation determination may be output to warn a user.

Figure 3:
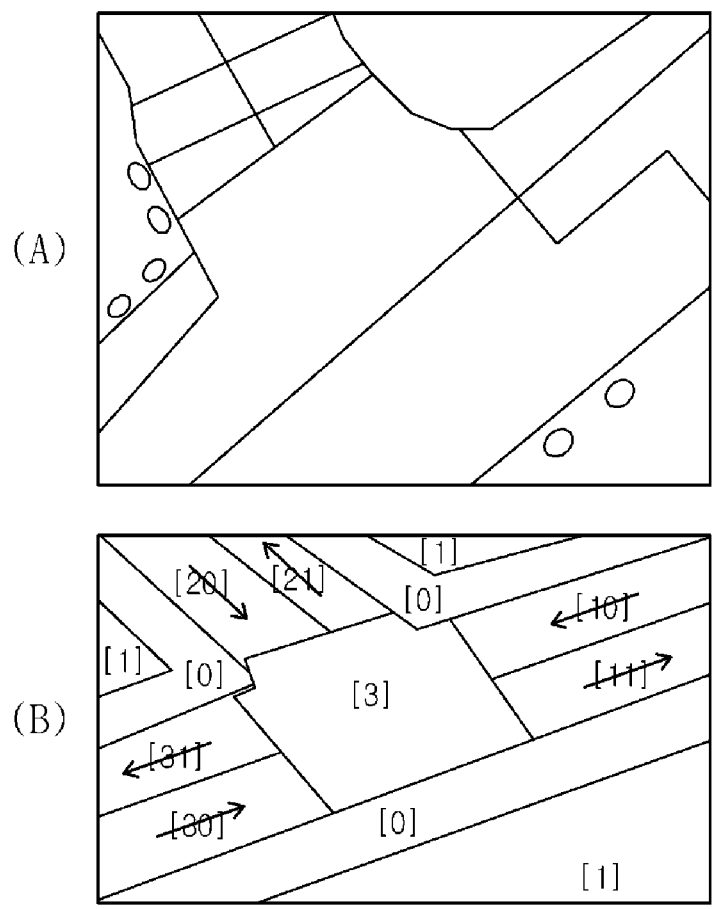
FIGS. 3 and 4 are views each illustrating another screen image for illustrating an image-based situation recognition method using a template.
Figure 4:
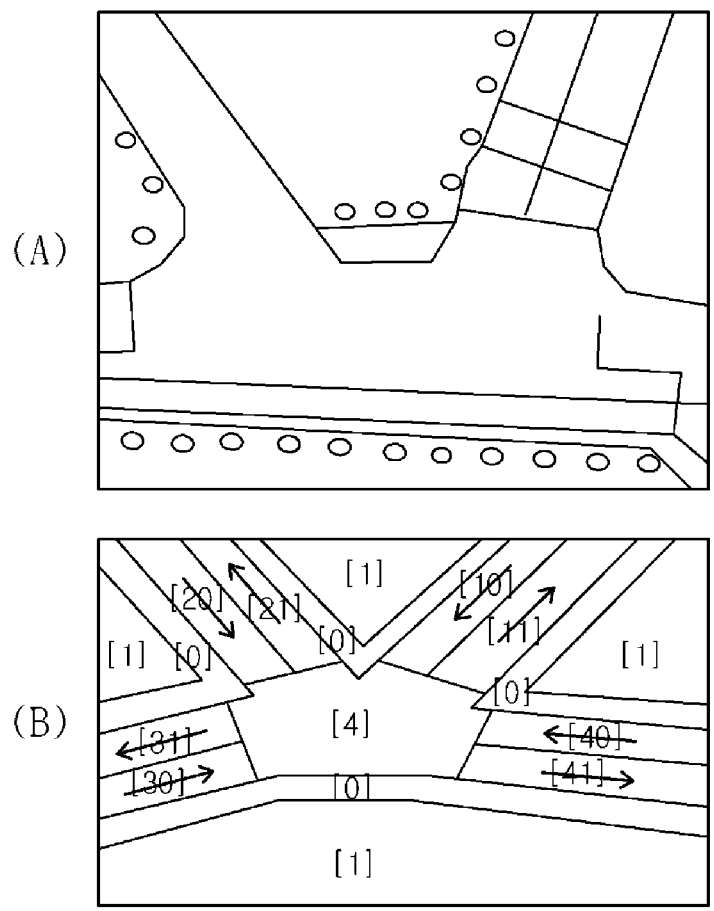

FIGS. 3 and 4 are views each illustrating another screen image for illustrating an image-based situation recognition method using a template.

Referring to FIGS. 3 and 4, images such as (A) of FIG. 3 and (A) of FIG. 4 are each divided into a plurality of regions, and a template is set for each region. Examples of the screen image having templates set therein are shown in (B) of FIG. 3 and (B) of FIG. 4, respectively. As described in FIG. 2 and Table 1, the template [0] denotes a sidewalk, the template [1] denotes a background (vacant lot), and the templates [1X], [2X], [3X], and [4X] are drivable ways. Furthermore, the template [X0] denotes the direction of "←" and the template [X1] denotes the direction of "→." As such, a template may be created based on an image received from a camera and then be given a meaning, thus increasing object detection accuracy and situation recognition reliability.

Figure 5:
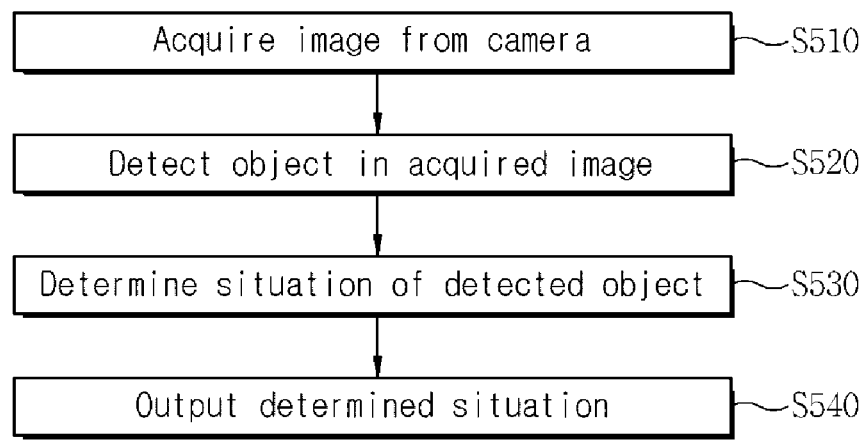
FIG. 5 is a flowchart illustrating an image-based situation recognition method according to an embodiment of the present invention.

FIG. 5 is a flowchart illustrating an image-based situation recognition method according to an embodiment of the present invention.

Referring to FIG. 5, a situation recognition device 100 acquires an image through a camera unit 110 in operation S510.

Subsequently, the situation recognition device 100 detects an object in the acquired image with reference to a template in operation S520. As shown in FIGS. 2 to 4, the situation recognition device 100 may determine whether each region is a sidewalk or a drivable way with reference to the template, and predict an object to be detected in each region. As such, in a case in which the object is detected with reference to the template, there is a high probability that an object detected in a region corresponding to a template [0] is a person since the template [0] denotes a sidewalk and an object detected in a region corresponding to a template [2X] is a vehicle since the template [2X] denotes a drivable way. Accordingly, when detecting an object in each region, the object detection accuracy can be increased by referring to the templates.

The situation recognition device 100 determines a current situation of the detected object with reference to a template of a region including the object in operation S530. In an embodiment of the present invention, the template defines a behavioral characteristic of an object that is detected in a corresponding region. The situation recognition device 100 compares the behavioral characteristic of the object that is defined in the template with a behavior of the detected object to determine a situation of the object. For example, the template [2X] denotes a drivable way, and the template [X0] denotes the direction of "←." Accordingly, there is a high probability that an object detected in a region corresponding to the template [20] will be a vehicle. If the detected object is a vehicle, the vehicle must move in the direction of "←." If in the template [20], the object (vehicle) moves in the direction of "→," the vehicle may be determined as driving in the wrong lane. In addition, the template [0] denotes a sidewalk. If a vehicle is detected, as the object, in a region that is mapped to the template [0], the vehicle may be determined as trespassing on the sidewalk.

After determining the situation of the object, the situation recognition device 100 outputs the situation of the recognized object in operation S540. In other words, the situation recognition device 100 performs processing according to the determined situation. For example, when the vehicle is determined as driving in the wrong lane or as trespassing on the sidewalk, the situation determination may be output to warn a user.

The image-based situation recognition method according to an embodiment of the present invention may be implemented as program instructions executable by a variety of computers and recorded on a computer readable medium. Here, the recording medium may include a program instruction, a data file, a data structure, or a combination thereof. The program instructions recorded on the computer readable medium may be designed and configured specifically for the present invention or can be publicly known and available to those who are skilled in the field of software. Examples of the storage medium include a magnetic medium, such as a hard disk, a floppy disk, and a magnetic tape, an optical medium, such as a CD-ROM, a DVD, etc., a magneto-optical medium such as a floptical disk, and a hardware device, such as a ROM, a RAM, a flash memory, etc. specially configured to store and perform program instructions. Examples of the program instruction include a high-level language code executable by a computer with an interpreter, in addition to a machine language code made by a compiler. The above exemplary hardware device can be configured to operate as one or more software modules in order to perform the operation of the present invention, and vice versa.

Although specific embodiments have been illustrated and described herein, it is obvious to those skilled in the art that many modifications of the present invention may be made without departing from what is intended to be limited solely by the appended claims. While preferred embodiments of the present invention have been described using specific terms, such description is for illustrative purposes only, and it is to be understood that changes and variations may be made without departing from the spirit or scope of the following claims.

What is claimed is:

1. An image-based situation recognition device, comprising:
   a camera that captures an image,
   wherein the entire captured image is divided into a plurality of regions, and
      wherein each of the divided regions is mapped to a template defining a characteristic of the each of the divided regions; and
   a control unit that
      detects an object in the captured image, and
   determines a situation of the object according to the template mapped to the region including the detected object;
   wherein the template defines a behavioral characteristic of the object detected in the region,
   wherein the control unit compares a behavior of the object detected in the region with the behavioral characteristic of the object defined in the template to determine the situation of the object,
   wherein, among the divided regions, regions having the same characteristic are grouped, and then mapped to the same template, and
   wherein the characteristic includes at least one selected from the group consisting of a sidewalk, a vacant lot, a drivable way and a drive direction.

2. The image-based situation recognition device of claim 1, wherein the template defines a type of the object detected in the region.

3. The image-based situation recognition device of claim 2, wherein the control unit detects the object in the region with reference to the type of the object defined in the template.

4. An image-based situation recognition method of an image-based situation recognition device, the method comprising:
   capturing, by a camera of the image-based situation recognition device, an image,
      wherein the entire captured image is divided into a plurality of regions, and
      wherein each of the divided regions is mapped to a template defining a characteristic of the each of the divided regions;
   detecting, by a processor of the image-based situation recognition device, an object in the captured image; and
   determining, by the processor of the image-based situation recognition device, a situation of the object according to the template mapped to the region including the detected object
   wherein the template defines a behavioral characteristic of the object detected in the region,
   wherein the determining comprises comparing a behavior of the object detected in the region with the behavioral characteristic of the object defined in the template to determine the situation of the object,
   wherein, among the divided regions, regions having the same characteristic are grouped, and then mapped to the same template, and
   wherein the characteristic includes at least one selected from the group consisting of a sidewalk, a vacant lot, a drivable way and a drive direction.

5. The image-based situation recognition method of claim 4,
   wherein the template defines a type of the object detected in the region, and
   wherein the detecting comprises detecting the object in the region with reference to the type of the object defined in the template.

* * * * *